Feb. 2, 1965 L. L. LESS 3,167,784
NECKWEAR FOR SUPPORTING AN ORNAMENT
Filed Oct. 4, 1962 3 Sheets-Sheet 1
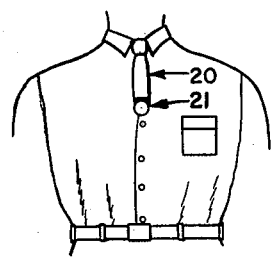
FIG.1.
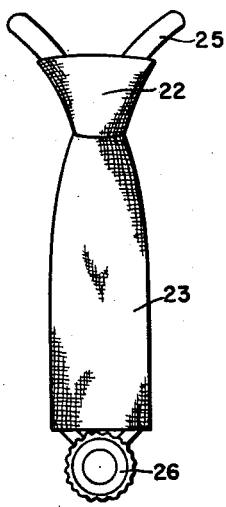
FIG.2.
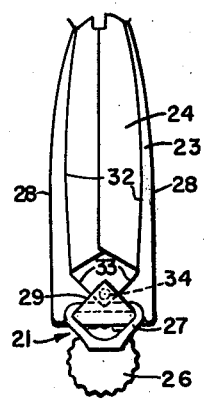
FIG.3.
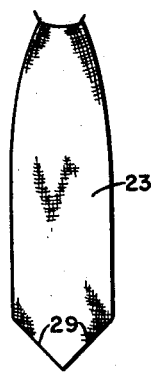
FIG.4.
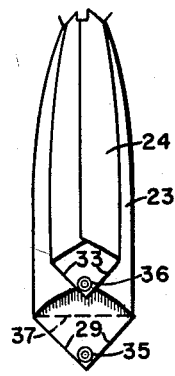
FIG.5.
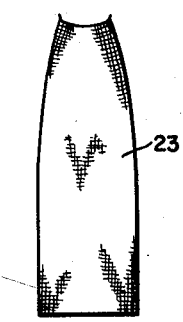
FIG.6.
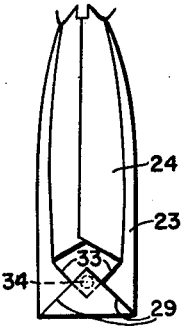
FIG.7.
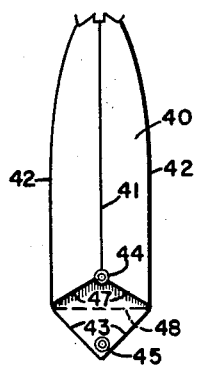
FIG.8.
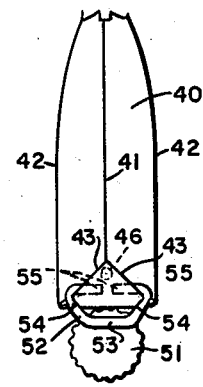
FIG.9.
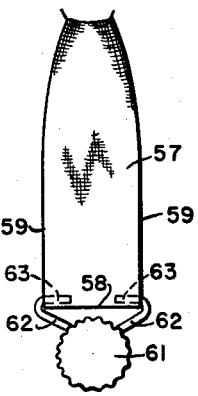
FIG.10.
FIG.11.
INVENTOR.
Louis L. Less
BY
*Arnold & Roylance*
ATTORNEYS Feb. 2, 1965 L. L. LESS 3,167,784
NECKWEAR FOR SUPPORTING AN ORNAMENT
Filed Oct. 4, 1962 3 Sheets-Sheet 2

INVENTOR.
Louis L. Less
BY
Arnold & Roylance
ATTORNEYS

Feb. 2, 1965     L. L. LESS     3,167,784
NECKWEAR FOR SUPPORTING AN ORNAMENT
Filed Oct. 4, 1962     3 Sheets-Sheet 3

INVENTOR.
Louis L. Less
BY
*Arnold & Roylance*
ATTORNEYS

United States Patent Office 3,167,784
Patented Feb. 2, 1965

3,167,784
NECKWEAR FOR SUPPORTING AN ORNAMENT
Louis L. Less, Clinton, Iowa, assignor to One-in-Hand Tie Company, Clinton, Iowa, a partnership
Filed Oct. 4, 1962, Ser. No. 228,378
10 Claims. (Cl. 2—150)

This invention relates to neckwear, and more particularly to neckties having ornaments depending from them.

An object of this invention is to provide articles of neckwear which have a new and unusual appearance.

A further object of the invention is to provide such articles of neckwear which are convertible, and may be worn in a number of different ways, each presenting a different appearance. A still further object is to provide an easy method of making the neckwear of the invention.

The invention may be understood by reference to the following detailed description taken in conjunction with the drawings, which form a part of the specification, and in which:

FIG. 1 is a front view of the torso of a person wearing an article of neckwear constructed in accordance with one embodiment of this invention, illustrating the general appearance of the article of neckwear when worn;

FIG. 2 is a front elevation of an article of neckwear constructed in accordance with one embodiment of this invention, and comprising a short, pre-tied necktie with a detachable ornament;

FIG. 3 is a rear elevation of a portion of the neckwear shown in FIG. 2;

FIG. 4 is a front elevation of a portion of the neckwear shown in FIGS. 2 and 3, with the ornament removed;

FIG. 5 is a rear elevation of that portion of the neckwear shown in FIG. 4;

FIG. 6 is a front elevation of a portion of the neckwear of the embodiment shown in FIG. 2, with the ornament removed and with the end of the necktie arranged in a slightly different fashion than shown in FIGS. 4 and 5;

FIG. 7 is a rear elevation of that portion of the embodiment shown in FIG. 6;

FIG. 8 is a rear elevation of a portion of another embodiment of the neckwear of this invention, in which the necktie has no tail;

FIG. 9 is a rear elevation of a portion of the embodiment shown in FIG. 8, with an ornament attached thereto;

FIG. 10 is a front elevational view of another embodiment of neckwear in accordance with this invention;

FIG. 11 is a side elevational view of the embodiment shown in FIG. 10, with the ornament removed;

Figure 12:
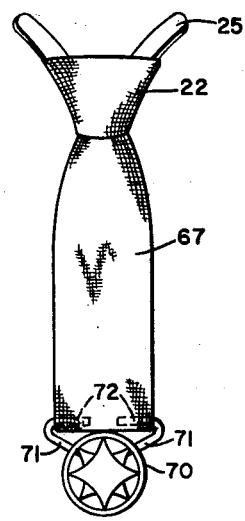
FIG. 12 is a front elevational view of still another embodiment of neckwear constructed in accordance with this invention.

FIG. 1 illustrates the overall appearance created by the neckwear embodiment of FIGS. 2–7 when worn in the manner shown in FIGS. 2 and 3. The neckwear comprises two parts: A "shorty" tie portion 20 and an ornament 21 depending from its end. The novel and unusual appearance of the neckwear of this embodiment is due both to the shortness of the tie and to the ornament depending from the end of it. While conventional ties have varying lengths, they customarily extend from the neck of the wearer down to a point close to the top of his pants (or the top of his belt). There are various "shorty" type ties on the market, but these are invariably of the "string" type; that is, they are customarily constructed of a very thin or string-like material, and do not use a conventional knot. They are clearly distinguishable and not at all related to, the conventional "four-in-hand" tie. The tie portion of the neckwear of this and many of the other embodiments of this invention, on the contrary, provides a knot and depending tie portion which is identical in appearance to the conventional "four-in-hand" tie in every respect save for its length. The unique appearance is obtained by making the length of the tie, from the top of the knot (which is normally the same as the top of a collar of the wearer) to the bottom of the depending portion, substantially less than half the distance from the top of the collar to the top of the pants (or top of the belt) of a normal adult wearer. The length may typically be about five or six inches.

Referring now to FIGS. 2–7, the neckwear embodiment shown therein may be seen to comprise a tie having a knot 22 and a depending portion comprising a front portion 23 and a tail 24. The tie may conveniently be of the ready-tied type shown in FIG. 2, formed upon a knot forming device 25, although it may be of the conventional self-tied type as well. However, the relatively accurate positioning of the ends of front portion 23 and tail 24 with respect to each other required for attachment of ornament 21 make the use of the ready-tied type more convenient.

Ornament 21 (FIGS. 2 and 3) comprises a medallion 26 and a tie-attaching loop 27, attached to it. Medallion 26 may be of any desired ornamental configuration, as it comprises that portion of ornament 21 designed to be displayed.

Since the particular configuration of knot forming device 25 or of knot 22 forms no part of this invention insofar as it relates to neckwear structures, the knot and the knot forming device have been omitted from FIG. 3 and most of the other figures. As may be best seen in FIG. 3, front portion 23 is of conventional width, having two generally parallel sides 28. Toward the bottom end of front portion 23, generally parallel sides 28 merge into converging sides 29 (FIGS. 3 and 4) which meet in a point. Similarly, tail 24 has generally parallel sides 32 ending in merging sides 33 which meet in a point. Tail 24 may be slightly narrower than front portion 23, as shown in FIGS. 2–7, or it may be of substantially the same width, but in either case it is adapted to completely underlie front portion 23 in the same manner as the tail of a conventional "four-in-hand" tie. Ornament 21 may be attached to the end of the tie, as shown in FIGS. 2 and 3, by bringing the pointed end of front portion 23 upward and to the rear, passing it through loop 27, and attaching it to the bottom of tail 24. The ends of front portions 23 and tail 24 are attached in the embodiment shown in FIG. 3, by a snap 34. As may be seen in FIG. 5, where the ornament has been removed, snap 34 comprises two halves, 35 and 36, with the former being attached to the rear of front portion 23 adjacent to the pointed end thereof and the latter similarly attached to the rear of tail 24 adjacent to its pointed end.

In the embodiment shown in FIG. 3, the width of loop 27 is less than the width of front portion 23 of the tie, and therefore the inside of loop 27 is engaged by converging sides 29 and supported thereby, resulting in the tie-engaging loop 27 being pulled up somewhat behind front portion 23 (as viewed from the front in FIG. 2) so that only a small portion of it is in view, presenting a neat appearance. Alternatively, loop 27 could be sufficiently wide so that it would be supported, instead of by converging sides 29, by the fold formed at the bottom of front portion 23 by the turned-up end.

The versatility of this neckwear embodiment is illustrated by the two optional methods of wear shown in FIGS. 2 and 5, and in FIGS. 6 and 7, respectively. FIGS. 4 and 5 show front and rear views, respectively, in which the ornament has been removed, snap 34 opened, and the tie is worn with pointed ends, differing from a conventional pointed-end four-in-hand type tie only in its short length. In FIG. 5, dotted line 37 illustrates the line along which front portion 23 is folded when its end is brought upwardly and to the rear and snap-fastened to tail 24.

FIGS. 6 and 7 are front and rear views, respectively, of this neckwear embodiment worn in yet another fashion. The ornament 21 has been removed, and the tie portion is worn with front 23 and tail 24 snapped together, resulting in a squared-off end.

Thus, it will be seen that the neckwear embodiment shown in FIGS. 2 through 7 is highly versatile, capable of being worn so as to provide three separate and distinct appearances. The snap-engaging feature, in addition to providing support for ornament 21 and permitting alternatively a pointed or squared-off end, is also adapted, when the snaps are engaged, to maintain the alignment of the front and tail portions of the tie, preserving a neat appearance.

FIGS. 8 and 9 illustrate a neckwear embodiment in which the tie portion is of short length, as in the embodiment of FIGS. 2–7, and comprises only a single depending portion 40, with no tail; and which may be worn either with or without an attached ornament. Depending portion 40 may be of conventional tubular construction, having a seam 41 running vertically down the back and having roughly parallel sides 42 which merge near the bottom of the tie into converging sides 43, which form a point at the bottom of the tie. Upper and lower halves 44 and 45, respectively, of a snap fastener 46 are attached to the rear of tie portion 40. The upper snap half 44 is shown in FIG. 8 attached at the junction of the bottom of seam 41 where it meets diverging edges 47 which connect with sides 42. The lower half 45 of snap 46 is attached to the rear of depending portion 40 adjacent to the point formed by converging sides 43. This tie may be worn as shown in FIG. 8, without an attached ornament and with the snap unfastened; in which cases its appearance from the front will be identical to that of the embodiment shown in FIG. 4.

The tie shown in FIG. 8 may also be worn without an attached ornament by folding the bottom of depending portion 40 up and to the rear and fastening the two halves 44 and 45 of snap 46. This transforms it into a square-ended tie, the appearance of which from the front is identical to the embodiment shown in FIG. 6.

The tie of FIG. 8 may also be worn with an attached ornament, as shown in the rear elevational view of FIG. 9. Note that the method of attachment of the ornament to the tie in FIG. 9 is similar to the attachment of ornament 21 to the tie, as shown in FIG. 3. However, in FIG. 9, the tie is shown in combination with an ornament having a slightly different configuration of tie-attaching means than loop 27 of ornament 21, as shown in FIG. 3. The ornament of FIG. 9 comprises a medallion 51 to which is attached a tie-attaching loop 52 comprising a horizontally disposed bar-like portion 53 attached to the rear of medallion 51, arms 54 extending upwardly and outwardly from the ends of bar 53 and bent over at their ends into horizontal, inwardly extending portions 55. Loop 52 is open, there being a space between the ends of the two horizontally extending portions 55. The ornament is attached to the tie by folding the bottom of depending portion 40 to the rear and upwardly, passing it through loop 52, and fastening together the two halves 44 and 45 of snap fastener 46. Here, as was the case with ornament 21 in FIG. 3, the width of loop 52 is less than the width of depending portion 40, and therefore the sides of the loop are engaged by, and the loop is supported by, converging sides 43. Because of the opening between the ends of horizontally extending arms 55, snap 46 need not be disconnected in order to attach or remove the ornament; the tie material may be slipped through the opening in the loop.

The embodiment of FIGS. 10 and 11 is like that of FIGS. 8 and 9, in that it has a necktie of the same sort of length, whose depending portion comprises only a front portion with no tail. Front portion 57 is defined by two substantially parallel sides 59 and a horizontal bottom edge 58, giving the tie a squared-off appearance. Depending portion 57 is fabricated of more than one thickness of material, so that it may be said to possess an outside and an inside. Provision for suspending an ornament from the tie is made by providing two holes 60, one in each of the sides 59 (shown in FIG. 11) adjacent bottom edge 58, and extending from the exterior of the tie to the interior.

The ornament comprises medallion 61, to the rear of which are attached two outwardly and upwardly extending arms 62, which latter are terminated by two horizontal, inwardly extending arms 63 which do not meet. Arms 63 fit into holes 60 to suspend medallion 61 below the end of the tie. The space between the ends of horizontal arms 63 permits the tie material to be slipped off of the arms, making the medallion removable. This embodiment may be worn with the ornament attached, as shown in FIG. 10, or as a square-ended "shorty" tie without the ornament, as in FIG. 11.

Figure 13:
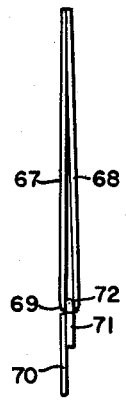
FIG. 13 is a side elevational view of a portion of the embodiment shown in FIG. 12.

In the neckwear embodiment shown in FIGS. 12 and 13, the necktie is of the same short length as in the embodiments previously described, and has a depending portion fashioned of a continuous loop of material, there being a front portion 67 and a rear portion (or tail portion) 68 joined along a fold 69 at the bottom. A medallion 70 is attached to the bottom of the depending portion by means of arms 71 extending outwardly and upwardly from the rear of the medallion, to which they are attached, and whose ends 72 are bent inwardly and engage fold 69 at the bottom of the tie. The ends of arms 72 are spaced apart to provide for detachable mounting, and the tie may be worn either with or without the ornament. Since the tie has a loop at the bottom instead of two free ends, it cannot be tied in the manner of a conventional four-in-hand tie, and is adapted to be furnished as a pre-tied tie such as the one shown in FIG. 12.

Figure 14:
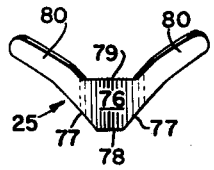
FIG. 14 is a front elevational view of a knot forming device which may be used in the construction of neckwear in accordance with this invention.
Figure 15:
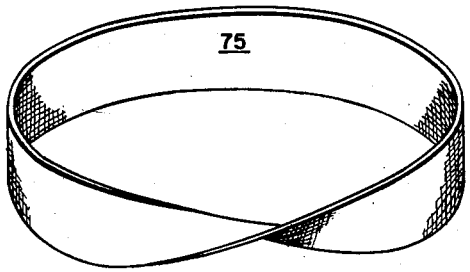
FIG. 15 is a perspective view of a loop of material used to fabricate the tie portion of the neckwear shown in the embodiment of FIGS. 12 and 13.

The tie of the embodiment of FIG. 12 may be formed of a knot-forming device 25 of conventional configuration (FIG. 14) and a loop of material 75 (FIG. 15). The knot-forming device 25 may be seen from FIG. 14 to comprise an inverted frusto-conical portion 76 defined by converging sides 77, a bottom edge 78 and a top edge 79. From the upper corners of inverted frusto-conical portion 76, two arms 80 extend upwardly and outwardly, and are adapted to fit under the collar of the wearer in a well-known manner. As may be seen from FIG. 15, loop 75 is formed of a strip of material having a half twist in it. It thus forms what is known in mathematics as a Möbius strip, that is, a strip having only one continuous edge and one continuous side.

Figure 16:
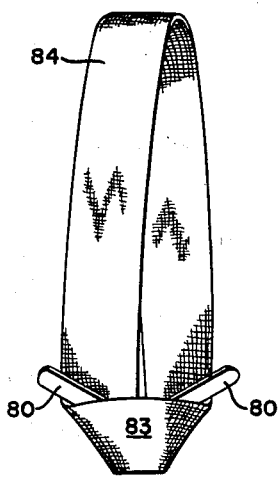
FIG. 16 shows a first step in the combination of the knot forming device of FIG. 14 and the loop of material of FIG. 15 to form the tie portion of the neckwear embodiment of FIGS. 12 and 13.
Figure 17:
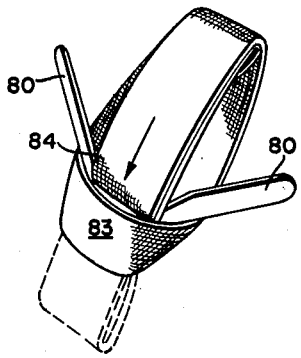
FIG. 17 is an isometric view of a further step in the fabrication of the tie portion of the embodiment shown in FIGS. 12 and 13.

Referring now to FIG. 16, in assembling loop 75 upon knot-forming device 25, a portion 83 of the loop is passed across the front of inverted frusto-conical portion 76. Loop 75 is then folded upwardly and to the rear along converging sides 77. The folded end 84 of the loop will then extend upwardly behind knot-forming device 25. The next step, as shown in FIG. 17, is to bring folded end 84 down and pass it between front portions 83 of the loop and inverted frusto-conical portion 76 of the knot-forming device. The passage of the end 84 of loop 75 thusly is shown in the successive solid and dotted line positions of FIG. 17. End 84 of loop 75 is then pulled down to its fullest extent, as the rest of the loop is molded into knot 22. By providing loop 75 in the form of a Möbius strip, with a half twist, it is possible to assemble this tie as just described in a simple and easy operation. The use of this method and the use of the particular configuration of loop 75 is not restricted to use only with the particular knot-forming device shown in FIG. 14, but may be used with any of the conventional knot-forming devices which have a main body portion with two upwardly and outwardly extending arms.

Figure 18:
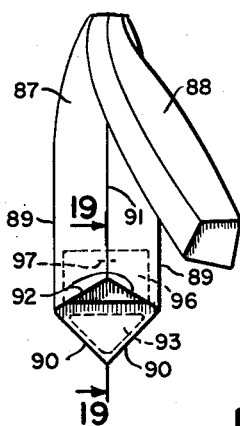
FIG. 18 is a rear elevational view of a portion of another embodiment of the neckwear of this invention.
Figure 19:
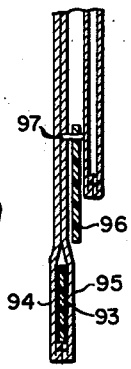
FIG. 19 is a section taken along line 19—19 of FIG. 18.
Figure 20:
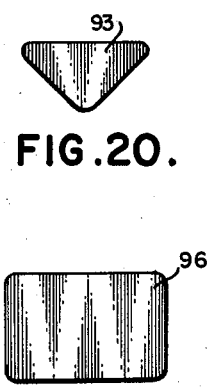
FIG. 20 is an elevational view of a triangular stiffener adapted for use in the point of the necktie shown in FIG. 18.
Figure 21:
FIG. 21 is an elevational view of a rectangular stiffener adapted for use with the necktie of the embodiment shown in FIG. 18.

Turning now to FIG. 18, there is shown a portion of a short necktie having a front portion 87 and a tail 88. Tail 88, which normally underlies front portion 87, is shown bent out of the way in FIGS. 18 and 22, to reveal the details of the rear of front portion 87. The front portion is of conventional flattened tubular form, with the flattened tube being made of a double thickness of cloth. It has two roughly parallel sides 89 which merge at the bottom into converging sides 90 which meet at a point. There is a seam 91 at the rear of the front portion, and the bottom of seam 91 forms the apex of upwardly converging edges 92. A flexible, resilient, triangular-shaped stiffener 93 (FIG. 20) is firmly imbedded in the pointed end of the tie between the two thicknesses of cloth 94 and 95 (FIG. 19). A rectangular stiffener 96 (FIG. 21), which is also of flexible, resilient material is positioned within the opening of the flattened tubular body of front portion 87 and fastened by a staple 97 or the like to the rearward thickness of cloth 95 in the forward facing portion of the tubular body of front portion 87. As may be seen from FIG. 18, rectangular stiffener 96 is positioned just above triangular stiffener 93. Looking at the rear of the front portion 87, most of rectangular stiffener 96 is hidden from view, but upwardly converging edges 92 expose a portion of the bottom center of stiffener 96, making an ideal place for the display of advertising indicia or the like. It should be noted that tail 88 is not necessary to this embodiment; the tie portion may consist solely of a front portion. If the tail portion is present, its length is such that it does not extend below the level at which converging sides 93 meet parallel sides 89.

Figure 22:
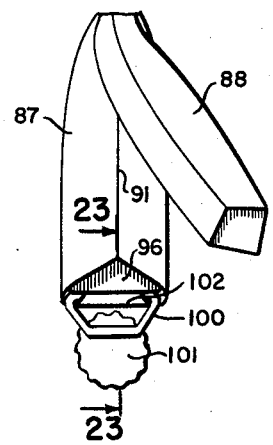
FIG. 22 is a rear elevational view of the portion of the necktie shown in FIG. 18, with an ornament attached.
Figure 23:
FIG. 23 is a section taken along line 23—23 of FIG. 22.

As may be seen in FIGS. 22 and 23, an ornament is attached to the bottom of the tie of FIG. 18 by passing the bottom triangular end of front portion 87 through loop 100 attached to the rear of medallion 101. Resilient stiffener 93 is then flexed and the triangular end is slid up between rectangular stiffener 96 and the material to which it is attached, providing a fold 102 at the bottom of the tie, which supports the ornament. The relatively stiff triangular end is thus held between two surfaces, the tie material and rectangular stiffener 96, in such a manner that the triangular stiffener 93 must be flexed in order to remove the end of the tie. Stiffener 93 must be resilient enough to permit it to be easily flexed for insertion between the two contiguous surfaces which will hold it, yet must be sufficiently stiff so that the weight of the ornament will not cause it to flex and result in the pointed end of the tie being pulled out from its tucked-in position. The pointed end of the tie may be stiffened by means other than an insert of sheet material, and the surfaces between which it is tucked need not be formed by fastening a sheet of stiff material to the tie, as in this embodiment, but may comprise any two closely spaced or contiguous surfaces or edges located above the stiffened portion and spaced from it by a distance less than the vertical extent of the stiffened portion of the tie. If the surfaces or edges between which the stiffened portion is tucked are spaced above the top of the stiffened portion a distance greater than the vertical extent of the stiffened portion, then it would be possible to pull out the tucked-in tie end without having to flex the stiffened portion. The tie may also be worn without the attached ornament, either as a pointed end type tie as shown in FIG. 18, or by tucking up the end to give a square ended style.

Figure 24:
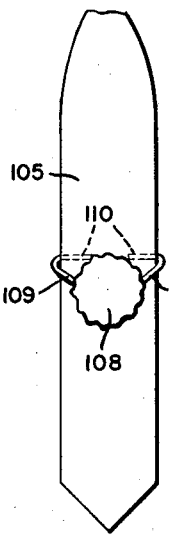
FIG. 24 is a front elevational view of a portion of another neckwear embodiment according to this invention, in which an ornament is suspended from a tie of conventional length.
Figures 25, 26:
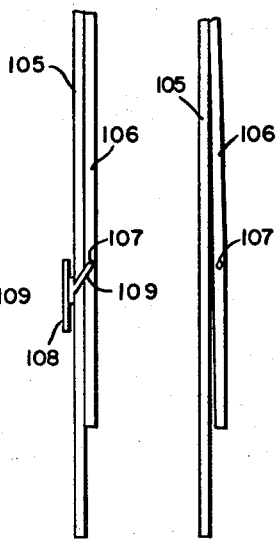
FIG. 25 is a side elevational view of a portion of the embodiment of FIG. 24.
FIG. 26 is a side elevational view of a portion of the embodiment of FIG. 24 with the ornament removed.

FIGS. 24–26 show another embodiment in which an ornament is hung from a four-in-hand style tie of conventional length, which may be either self-tied or of the ready-tied type. The tie may be seen to comprise front and tail portions 105 and 106, respectively, of conventional length and formed of two thicknesses of material, so that they may be said to posses an interior and an exterior. On either side of the tail portion are provided holes 107 leading from the exterior to the interior of the tie, in a manner identical to holes 60 in the sides of the tie in the embodiment shown in FIGS. 10 and 11. An ornament comprising a medallion 108 attached to the rear of which are upwardly and outwardly extending arms 109 terminated by inwardly bent, horizontally extending ends 110 is attached to the tie by fitting ends 110 into holes 107 in the tail 106 of the tie. It may be seen that arms 109, passing around front 105, combine with the weight of the medallion to keep front 105 and tail 106 both aligned and pressed together, giving a neat appearance. The tie of course may be worn with the ornament removed. To make the ornament detachable, ends 110 of arms 109 do not meet, but rather there is a space between them which permits them to be pulled out of holes 107.

Figures 27, 28:
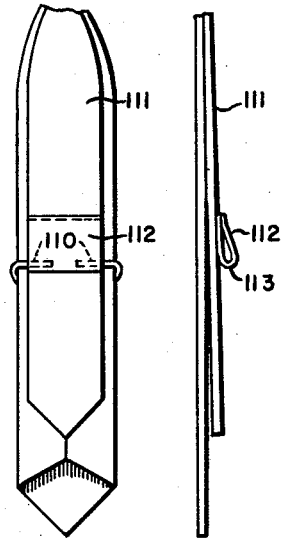
FIG. 27 is a rear elevational view of a portion of another embodiment having an ornament suspended from a conventional length tie, illustrating a slightly different method of attaching the ornament than that shown in the embodiment of FIGS. 24–26.
FIG. 28 is a side elevational view of a portion of the embodiment of FIG. 27, with the ornament being removed.

In FIGS. 27 and 28 another conventional length four-in-hand style tie is shown, with an ornament depending therefrom in a manner very similar to that of the embodiments shown in FIGS. 24–26. However, in the embodiment shown in FIGS. 27 and 28, the method of attachment of the ornament to the tail of the tie is slightly different. Tail 111, instead of being provided with holes as in the embodiment of FIGS. 24–26, is provided on its rear side with a loop of material 112, having a fold 113 at the bottom which supports inwardly extending arm ends 110.

What is claimed is:

1. An article of neckwear comprising, in combination, a necktie having a preformed knot and a portion depending from said knot,
   said knot being normally worn adjacent the top of the collar of the wearer,
   said depending portion being substantially wider than it is thick and terminating at a point substantially less than half the distance from the top of the collar to the top of the pants of a normal wearer,
   said depending portion comprising a front portion and a tail portion each having ends remote from said knot with the width of said tail portion being no greater than the width of said front portion and said front portion being adapted to substantially overlie said tail portion as normally worn, and
means attaching the remote end of said front portion to the remote end of said tail portion; and
an exposed ornament of material different from said necktie and depending from said remote ends of said depending portion of said necktie,
   said ornament comprising a medallion and tie-attaching means,
   said attached front and tail portions supporting said tie-attaching means, whereby said medallion is suspended below the end of said depending portion.

2. The article of neckwear of claim 1 wherein said front portion is longer than said tail portion and the end of said front portion is folded upwardly and to the rear,
the article of neckwear further comprising
separable fastening means attaching the end of said front portion to the end of said tail portion,
said tie-attaching means comprising a loop attached to said medallion,
said folded end of said front portion extending through said loop to suspend said ornament from said tie.

3. The article of neckwear of claim 1 wherein:
said front portion is longer than said tail portion;
the end of said front portion being folded upwardly and to the rear and wherein said attaching means comprises separable fastening means.

4. The article of neckwear of claim 1 wherein:
said front and tail portions are integral parts of the same material, and form a fold at the bottom of said depending portion.

5. The article of neckwear of claim 4 wherein:
said tie-attaching means comprises a loop attached to said medallion; and
said material forming said front and tail portions extends through said loop, with said loop being suspended from said fold at the bottom of said depending portion.

6. The article of neckwear of claim 5 wherein:
there is an opening in the periphery of said loop, whereby said material forming said depending portion may be disengaged from said loop by passing it through said opening.

7. In an article of neckwear, the combination of a necktie comprising
   a pre-formed knot structure including means for attaching the same to the wearer's collar,
   a front portion, and
   a tail portion,
   said front and tail portions depending from said knot structure with said front portion overlying said tail portion, said tail portion having a width no greater than the width of said front portion;
means joining said front and tail portions together at their ends opposite said knot structure;
an ornament of material different from said necktie; and
attaching means secured to said ornament and extending into the space between said front and tail portions above the joined ends thereof,
   said ornament being suspended in exposed position below the joined ends of said front and tail portions by said attaching means when said necktie is worn,
said front and tail portions being of such length that, when said knot structure is attached to the wearer's collar, the joined ends of said front and tail portion are spaced substantially above the wearer's belt line and said ornament is displayed against the wearer's shirt front.

8. In an article of neckwear, the combination of
a necktie comprising
   a pre-formed knot structure including means for attaching the same to the wearer's collar, and
   a tie body depending from said knot structure and formed as an integral fabric structure folded upon itself along a transverse fold line to provide a front portion and a tail portion, said front and tail portions extending separately from said fold line and being joined to said knot structure;
an ornament of material different from said necktie; and
attaching means secured to said ornament and extending into the space between said front portion and said tail portion above said fold line,
   said ornament being suspended in exposed position below said fold line by said attaching means when said necktie is worn,
the distance between said knot structure and said fold line being such that, when said knot structure is attached to the wearer's collar, said fold line is spaced substantially above the wearer's belt line and said ornament is displayed against the wearer's shirt front.

9. An article of neckwear in accordance with claim 8 and wherein
said knot structure comprises a knot forming device, and
said necktie comprises a single closed loop of necktie material,
   a portion of said loop constituting said tie body, the remainder of said loop being disposed on said knot forming device as a pre-tied necktie knot.

10. In an article of neckwear, the combination of
a necktie comprising
   a pre-formed knot structure including means for attaching the same to the wearer's collar, and
   a tie body depending from said knot structure and having a tip portion remote from said knot, said tie body having a lower end portion including two layers of tie material joined together at the tip of the tie body;
a generally flat medallion; and
an attaching element comprising a loop secured to said medallion and extending therefrom,
   said loop being substantially rigid, lying in a plane generally parallel to the plane of said medallion, and extending within the space between said layers of tie material above the tip of said tie body, whereby said medallion is suspended in exposed position below the tip of said tie body by said loop when said necktie is worn,
the distance between said knot structure and the tip of said tie body being such that, when said knot structure is attached to the wearer's collar, the tip of said tie body is nearer to the wearer's collar than to the wearer's belt line and said medallion is displayed against the wearer's shirt front.

References Cited by the Examiner

UNITED STATES PATENTS

D. 179,199   11/56   Kiraly _____ 2—91 X
517,769   4/94   Selowsky _____ 2—144

(Other references on following page)

UNITED STATES PATENTS

| | | | |
|---|---|---|---|
| 1,358,400 | 11/20 | Starr | 2—157 |
| 1,386,429 | 8/21 | Schmidt | 2—157 |
| 1,405,744 | 2/22 | Sampliner | 2—91 |
| 2,195,594 | 4/40 | Kreisler | 24—49 X |
| 2,502,921 | 4/50 | Bryant | 2—91 X |
| 2,578,807 | 12/51 | Johnson | 2—157 X |
| 2,846,688 | 8/58 | Meeker | 2—150 |
| 2,860,346 | 11/58 | Siebler et al. | 2—146 X |
| 2,890,509 | 6/59 | Boots | 24—49 |

FOREIGN PATENTS

| | | |
|---|---|---|
| 70,502 | 11/15 | Austria. |
| 442,684 | 3/36 | Great Britain. |
| 894,954 | 4/62 | Great Britain. |

JORDAN FRANKLIN, *Primary Examiner.*

DAVID J. WILLIAMOWSKY, *Examiner.*